Nov. 11, 1958 — T. L. HALL — 2,860,304

DETECTOR

Filed June 23, 1954 — 2 Sheets-Sheet 1

INVENTOR.
THOMAS L. HALL
BY Albert Sperry
ATTORNEY

INVENTOR.
THOMAS L. HALL
BY Albert Sperry
ATTORNEY

2,860,304
DETECTOR

Thomas L. Hall, Morrisville, Pa.

Application June 23, 1954, Serial No. 438,847

4 Claims. (Cl. 324—52)

This invention relates to electric cable testing devices and is particularly directed to novel detector means for use with impulse cable fault locators of the type shown and described in my U. S. Patent No. 2,306,783, issued December 29, 1942.

Generally, electric cables for use in the distribution of power or in communication systems consist of a plurality of electric conductors insulated from each other and from an enclosing metal sheath. The metal sheath is usually bonded electrically to the sheaths of other cables in the same run at spaced positions along its length and in common with them is grounded by contact with the earth in which they are buried or with the moist walls of the conduits through which they are drawn. In many cases the sheaths are also bonded to special grounding conductors installed for that purpose. Occasionally, the insulation of one of these electric conductors will break down forming a fault or short circuit. In the case of electric power cables the breakdown usually occurs between one of the conductors and the cable sheath. In the minority of cases where this does not occur on power cable, and in communication cables where such failures are not as common, faults may arise between adjacent conductors. In these instances the fault can be "burned down" to the sheath by the application of proper test voltages. Faults are especially difficult to locate in underground cables where access to the cables can be had only by way of manholes at widely spaced locations, or where the cable is buried directly in the ground without manholes.

To locate a fault, once it has occurred, it is customary to connect an impulse transmitter to one terminal of the faulted conductor and send out along the conductor a series of current pulses. The impulse transmitter is usually connected between the faulted conductor and ground and the pulse current travels out along the conductor to the fault and thence through the fault to the sheath. From the fault, it flows both ways along the sheath until it is dissipated to earth and to the sheaths of other cables by the bonds. A detector is applied to the cable at various points along its length to detect the presence and direction of the pulse current in the cable or sheath. The pulse current will disappear or greatly decrease a short distance past the fault because the pulses tend to return to the transmitter along the path of lowest reactance which is immediately adjacent to the route of the faulted cable back to the transmitter. There is, however, some carry-over of pulse current past the fault, that is, some current will flow along the sheath beyond the fault until it is dissipated to earth or to other cables. In actual practice, this carry-over may be for a distance extending to one or two manholes beyond the fault so that accurate location of the fault in many cases presents considerable difficulty.

The location of the exact point of fault by means of pulse currents with prior art detectors further calls for considerable experience. It is obvious that if the direction of the current flow in the sheath could be determined, the exact location of the fault could also be determined as it will be the point where the direction of the sheath current reverses. The classical method of determining the direction of current flow by voltage drop in the sheath, used in most prior art devices, has little value in practice because the voltages induced by the pulse current in probes and leads of the devices used to determine such voltage drop will be far greater than the sheath voltage drop itself. Furthermore, the induced currents will be of unknown magnitude and direction. Since the effect on the detector instrument is the net effect of all induced pulse voltages plus the sheath drop the directional indications obtained by devices of this sort are valueless.

These disadvantages of prior art detectors have been overcome with the present invention and a detector is provided which eliminates or balances out the interference caused by induced voltages and permits more critical determination of the direction of flow of sheath current and, therefore, more accurate location of faults.

In accordance with the present invention, these advantages are preferably attained by providing two opposed inductive elements with means for balancing the outputs of the elements in the presence of extraneous voltages, and thereafter destroying the balance in response to the sheath current to obtain an indication of the direction of current flow in the sheath and the direction of the fault with respect to the test point. In the preferred construction, herein described and illustrated, the system employs two opposed inductive detector loops which are coupled by a potentiometer system to the detection and amplification circuits of a detector instrument and having a biasing conductor which, when included in the circuit, serves to impress an indicating current upon the potentiometer system. The biasing conductor preferably passes in opposed relation with respect to the detector loops. In use, the two loops are positioned near the sheath and the opposing voltage induced in the loops are balanced against each other across the potentiometer until no current flows to the detector instrument. Thereafter, the ends of the biasing conductor are placed in contact with the sheath permitting a current to flow via the biasing conductor under one of the loops and over the other loop. This biases or tends to neutralize the current flowing in one of the loops. The current to the detector will then be responsive to the direction of flow of the sheath current. Accurate determination of the direction of the sheath current and precise location of the fault thus is made possible. To allow still greater accuracy, a second or shielding conductor may be placed in contact with the sheath at each end and arranged to encircle the entire detector assembly to further prevent extraneous inductive effects from interfering with the operation of the detector.

It is an object of the present invention to provide a novel detector for use with impulse cable fault locators which will permit more accurate determination of fault locations in electric cables.

An additional object of the present invention is to provide a novel detector for use with impulse cable fault locators which makes it easier to determine fault locations in electric cables.

A further object of the present invention is to provide a novel detector for use with impulse cable fault locators which is not adversely influenced by extraneous inductive effects.

Another object of the invention is to provide a cable fault detector in which two inductive elements are balanced at a test point and thereafter brought into imbalance in response to the cable sheath current to indicate the direction of the fault with respect to the test point.

A specific object of the present invention is to provide a novel detector for use with impulse cable fault locators and which comprises a pair of opposed inductive loops, coupled by means of a potentiometer for initially balancing opposed voltages induced in the loops, having a conductor passing under one of the said loops and over the other of said loops, for inducing a variation in voltage in one of said loops responsive to the direction of flow of sheath current in a cable under test and which may have an external shielding conductor to prevent interference by extraneous inductive effects.

These and other objects and features of the present invention will be apparent from the following description thereof wherein reference is made to the figures of the accompanying drawings.

Figure 1:
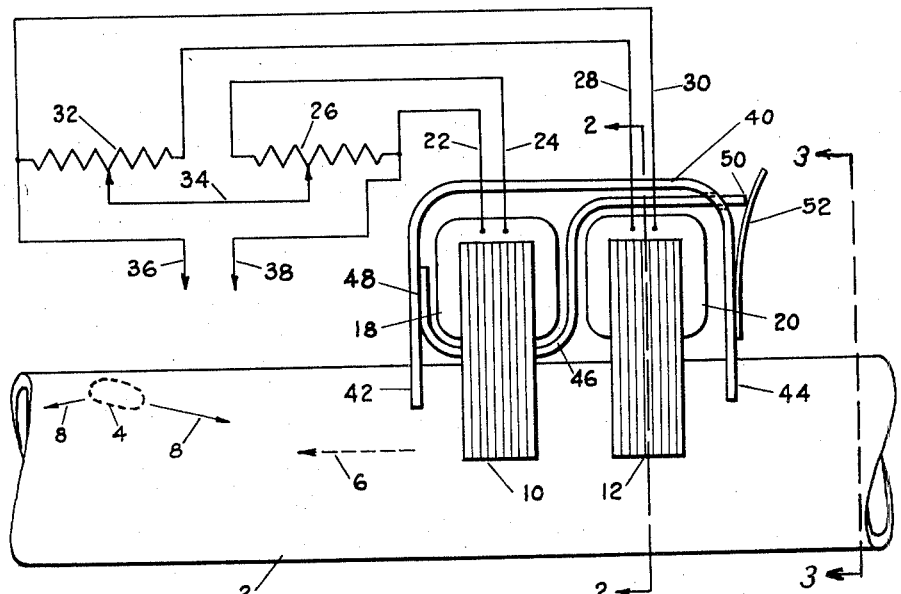
Fig. 1 is a schematic representation of a typical detector embodying the present invention.
Figure 2:
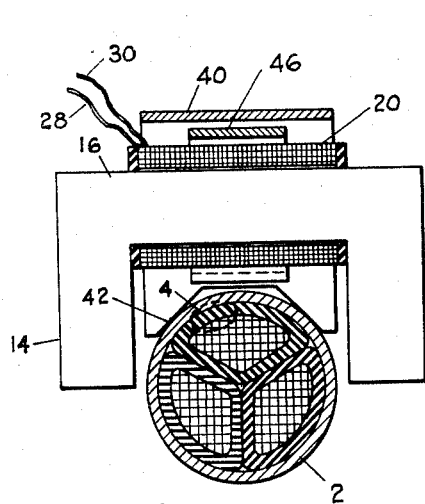
Fig. 2 is a sectional view of the device of Fig. 1 taken on the line II—II of Fig. 1.
Figure 3:
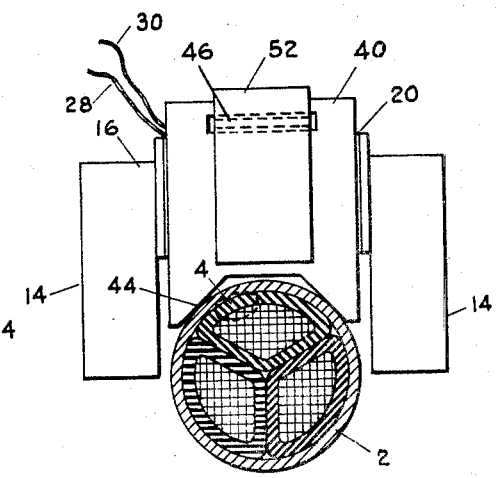
Fig. 3 is a view of the device of Fig. 1 taken on the line III—III of Fig. 1.

In that form of the invention chosen for purposes of illustration in Figs. 1, 2 and 3 of the drawings, the detector is shown as applied to a cable 2 having a fault 4. Pulse current is sent through the faulted conductor from an impulse transmitter (not shown) to the fault 4 as indicated by dotted arrow 6. From the fault 4, current flows in opposite directions through the sheath, as indicated by the arrows 8, toward the nearest ground bonds. As illustrated, the detector comprises two similar generally U-shaped members 10 and 12 formed of magnetically permeable material and each having legs 14 and a base 16. A loop 18 of conductive material is wound about the base 16 of the member 10, whereas an oppositely wound loop 20 is wound about the base 16 of the member 12. In this way, any current flowing in the vicinity of members 10 and 12 will set up a flux therein which will induce voltages in loops 18 and 20 and since loops 18 and 20 are wound in opposing relation, the induced currents will flow in opposite directions.

Lines 22 and 24 connect loop 18 across a resistor 26 and, correspondingly, lines 28 and 30 connect loop 20 across a resistor 32. A variable tap 34 joins resistors 26 and 32 and forms a potentiometer circuit for balancing the opposing voltages from loops 18 and 20 to balance out the influence of extraneous currents and to compensate for mechanical inequalities. Lines 36 and 38 connect resistors 26 and 32 to the detection and amplifying circuits of an impulse cable fault locator instrument, which may for example, be of the type shown in Fig. 2 of my above identified patent.

In addition, a shielding conductor 40 passes over or about both members 10 and 12 and loops 18 and 20 and makes contact with the sheath of cable 2 at 42 and 44. A biasing conductor 46 passes under member 10 and loop 18 and over member 12 and loop 20. One end of biasing conductor 46 preferably terminates in electrical contact with shielding conductor 40 at 48 while the other end preferably passes through a hole in shielding conductor 40 but is insulated therefrom and terminates at 50 in contact with a conducting spring leaf contact member 52. The lower end of leaf 52 is fixed in electrical contact with shielding conductor 40 and is so arranged that the electrical contact at 50 may be broken by deflecting the leaf contact member 52.

While the construction described above is preferred, leaf 52 may, if desired, be eliminated and biasing conductor 46 may be completely independent of shielding conductor 40. The important features of biasing conductor 46 is its general arrangement with respect to members 10 and 12 and loops 18 and 20 plus the fact that current is permitted to flow through biasing conductor 46 only when desired by the operator.

In use, the detector is positioned on the cable as illustrated in Figs. 1–3 with points 42 and 44 in electrical contact with the sheath. Leaf 52 is held out of contact with biasing conductor 46. In this condition, currents 6 and 8 in combination generate magnetic flux in permeable members 10 and 12. Also, shielding conductor 40 in combination with the sheath of cable 2 constitutes a one turn winding about both permeable members 10 and 12 together. The flux change in members 10 and 12 caused by the pulse current will induce a current in the winding above mentioned, consisting of shielding conductor 40 and part of the sheath of cable 2, which will reduce the flux density in members 10 and 12. Some of the sheath current will be diverted over shielding conductor 40 and will tend to alter the flux in members 10 and 12 but not the relative amounts in each. The flux changes in members 10 and 12 caused by the pulse current will also induce voltages in windings 18 and 20 respectively. These voltages will be carried by the various lines to resistors 26 and 32 where they are balanced by adjusting variable tap 34 so that no voltage appears between lines 36 and 38 and the effect on the detector instrument is zero. In so doing the variable tap 34 is so adjusted that the maximum possible voltage appears between line 36 and variable tap 34 and between line 38 and variable tap 34 respectively. These voltages being of opposite polarity will yield the desired result of zero voltage between lines 36 and 38. Ideally, members 10 and 12 and their respective loops 18 and 20 should be identical. This is not necessary in practice as lack of identity may be compensated for by variable tap 34.

After completion of the adjustment for balance, leaf contact member 52 is caused to contact the end of biasing conductor 46, as at point 50 in Fig. 1, thus permitting current to flow through biasing conductor 46 under member 10 and loop 18 and over member 12 and loop 20. The flux induced in the member 10 by the conductor 46 will be opposite to that induced in member 10 by conductor 40 and accordingly, the effects thereof will tend to cancel and the voltage induced in coil 18 and resistor 26 will be greatly reduced. At the same time, the flux induced in the member 12 and its coil 20 will be substantially unaltered so that current supplied to resistor 32 will remain approximately the same. Consequently, the voltage across resistor 32 will now be unopposed and applied in full to lines 36 and 38 causing an indication on the detector instrument. The direction of the voltage drop thus established will be dependent upon the direction of current flow in conductors 40 and 46 which is, obviously, the same as the direction of flow of the sheath current in cable 2. Therefore, by use of the device the direction of flow of sheath current may be determined and direction of the fault with respect to the test point will be indicated.

In underground cable runs consisting of a plurality of cables well bonded together, the sheaths of the cables in runs other than the one which is faulted, together with the bonding system to the sheath of the faulted cable, take the place of shielding conductor 40 in creating a closed loop about members 10 and 12. Therefore, shielding conductor 40 may be omitted in detectors used on such cable runs and accurate location of faults may still be made. The form of the invention illustrated in Fig. 4 may be used under such conditions. This form of the invention is similar to that shown in Fig. 1 except that shielding conductor 40 is omitted and, instead, one end 54 of biasing conductor 46 makes electrical contact with the cable sheath while the other end 50 extends to a position adjacent, but not in contact with, the cable sheath and is made somewhat flexible so that it can, when desired, be made to contact the cable sheath to allow current to pass through the biasing conductor 46.

In use, this form of the invention is operated similarly to the form of Figs. 1–3. The opposed currents from loops 18 and 20 are balanced across the potentiometer until no current flows to the detector instrument. Thereafter, current is allowed to pass through biasing conductor 46 substantially reducing the current induced in one loop, for instance, loop 18, and establishing the current induced in the other loop, namely loop 20, across the potentiometer so as to cause a reading on the detector instrument indicating the direction of flow of the sheath current.

Figure 5:
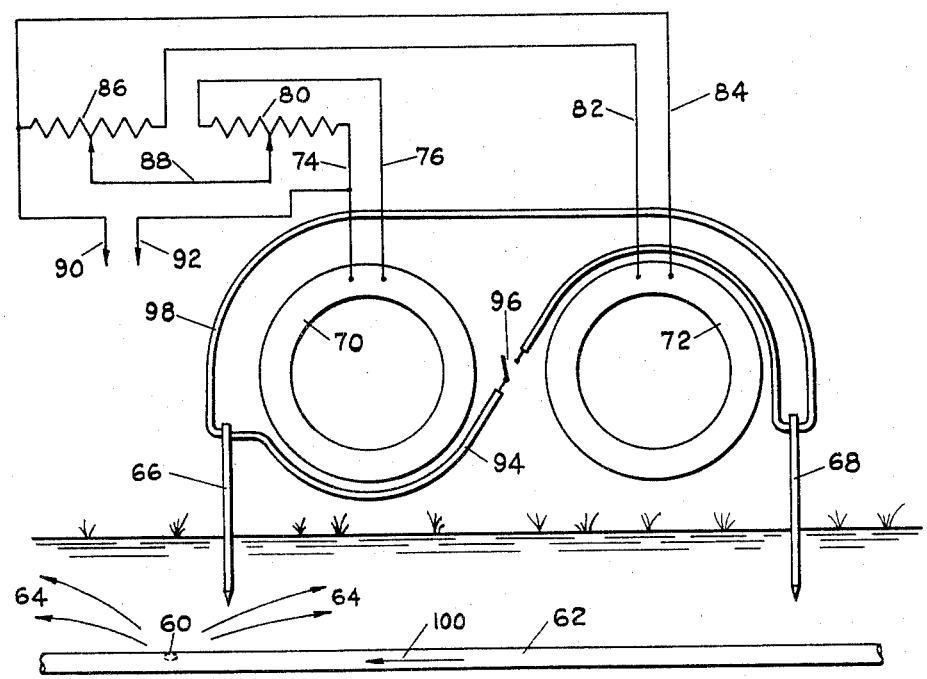
Fig. 5 is a schematic representation of a further modified form of detector embodying the present invention.

In the event that the cables to be tested are buried directly in earth, a somewhat different problem is presented than is posed by cables located in a conduit which are treated as described above. As illustrated in Fig. 5, when a fault 60 occurs in a cable 62 which is buried in earth, current generally flows to the sheath but is then dissipated through the earth in all directions from the fault as indicated by the arrows 64. If an impulse transmitter is connected to the faulted conductor and to the ground escaping through the fault will tend to return through the ground to the transmitter. Consequently, by tracing the ground return current, the position of the fault can be determined.

Figure 4:
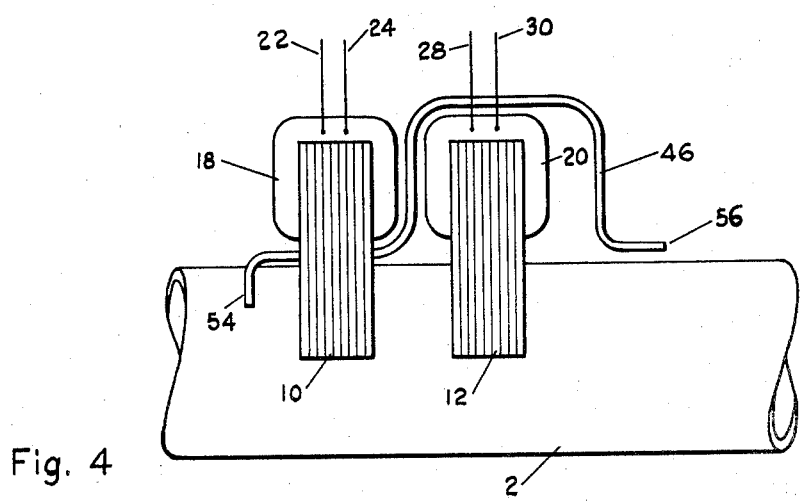
Fig. 4 is a schematic representation of a modified form of detector embodying the invention.

To detect the location of a fault under these conditions, a modification of the detector is employed. In this form of the invention, two probes 66 and 68 are driven into the ground at spaced points along the surface parallel to the cable 62 to be tested. Two opposingly wound loops 70 and 72 are provided and correspond generally to loops 18 and 20 of Figs. 1 and 4. Loop 70 is connected by lines 74 and 76 across a resistor 80 while loop 72 is connected by lines 82 and 84 across resistor 86. Resistors 80 and 86 are connected by variable tap 88 which serves as a potentiometer and corresponds to tap 34 of Figs. 1 and 4. Lines 90 and 92 connect resistors 80 and 86 to the detection and amplifying circuits of an impulse cable fault locator instrument. Also, a biasing conductor 94, corresponding to biasing conductor 46 of Figs. 1 and 4 is secured to probe 66 and passes under loop 70 and over loop 72 and is connected to probe 68. Biasing conductor 94 is arranged to be electrically broken by suitable means such as a switch 96. Shielding conductor 98 which corresponds to shielding conductor 40 of Fig. 1 passes over loops 70 and 72 with its end secured to probes 66 and 68 respectively.

In operation, this form of the invention is essentially the same as that of Fig. 1. The current 100 in the faulted cable 62 together with the ground return current flowing from the fault to the impulse transmitter induce opposing current in loops 70 and 72. These currents are balanced against each other through resistors 80 and 86 by the variable tap 88. When a balance has been obtained and no current flows to the impulse cable fault locator, the circuit through biasing conductor 94 is closed by means of switch 96. This permits some of the ground return current to flow through biasing conductor 94 reducing the current in loop 70 and destroying the balance. Consequently, current is caused to flow through lines 90 and 92 to provide a reading on the impulse cable fault locator detector instrument relative to the direction and magnitude of the ground return current. By taking successive readings at various points along the cable, a point will finally be reached where the direction of the earth current reverses. This will be the position of the fault. The action of the device illustrated in Fig. 5 in neutralizing extraneous inductive effects is entirely analagous to the device illustrated in Fig. 1.

It is obvious that the devices hereabove described may be constructed in numerous different mechanical forms and with numerous different geometrical and electrical arrangements of the component parts without departing from the scope of the invention. This is particularly true of members 10 and 12 of Figs. 1 and 4 which may be modified to suit specific conditions even to the extent of completely encircling the cable 2 and providing means for opening and closing so that the members may be placed around and removed from about the cable. It should, therefore be clearly understood that those forms of the invention described above and shown in the accompanying drawing are intended to be illustrative only and are not intended to limit the scope of the invention.

What I claim is:

1. A detector for use with an impulse cable fault locator for determining the position of a cable fault, said detector comprising a pair of opposing inductive devices, potentiometer means connected across the outputs of both said devices for balancing the currents therefrom, current bypass means arranged in opposed relation with said devices, and means operable to pass current from the sheath of the cable under test through said current bypass means for creating an imbalance between said outputs which serve to indicate the direction of flow of current in the sheath of the cable under test.

2. A decteor for use with an impulse cable fault locator for determining the position of a cable fault, said detector comprising a pair of inductive devices, potentiometer means connected across the outputs of both said devices for balancing the currents therefrom, and current bypass means extending over one of said inductive devices and under the other and means for passing current from the sheath of the cable under test through said bypass means for reducing the induced current in one of said devices while the current in the other of said devices remains substantially unchanged thereby providing an indication for application to said locator characterized by the direction of flow of current in the sheath of the cable under test.

3. A detector for use with an impulse cable fault locator for determining the position of a cable fault, said detector comprising a pair of opposed inductive loops, a potentiometer connected across the outputs of both said loops for balancing the currents from said loops, means connecting said potentiometer to the input of said locator, a pair of probes driven into the earth at spaced points along the cable to be tested, and a conductor arranged in inductive relation with said loops and so positioned that current passing through said conductor will induce an opposing voltage in one of said loops substantially reducing the flow of current from that loop while the current in the other of said loops remains substantially unchanged providing an indication on said locator dependent upon the direction of flow of ground current from the faulted cable, one end of said conductor being secured to one of said probes, the other end of said conductor being engageable with the other of said probes, and a shielding conductor connected to both of said probes and passing about both of said loops.

4. A detector for use with an impulse cable fault locator for determining the position of a cable fault, said detector comprising a pair of devices responsive to variations in magnetic flux for creating opposing electrical currents, means connected across the outputs of both said devices for balancing said currents, current bypass means engageable with the sheath of the cable under test and extending over one of said devices and under the other for differentially influencing said devices to give an indication on said impulse cable fault locator dependent upon the direction of current flow in the sheath of a cable under test.

References Cited in the file of this patent

UNITED STATES PATENTS 2,471,417    Dimmick et al.           May 31, 1949

FOREIGN PATENTS 790,832      France                  Nov. 28, 1935